(12) United States Patent
Tachibana et al.

(10) Patent No.: US 9,880,072 B2
(45) Date of Patent: Jan. 30, 2018

(54) TIRE HOLDING DEVICE AND TIRE TESTING SYSTEM

(71) Applicant: MITSUBISHI HEAVY INDUSTRIES MACHINERY TECHNOLOGY CORPORATION, Hiroshima-shi, Hiroshima (JP)

(72) Inventors: Makoto Tachibana, Hiroshima (JP); Morihiro Imamura, Hiroshima (JP)

(73) Assignee: MITSUBISHI HEAVY INDUSTRIES MACHINERY TECHNOLOGY CORPORATION, Hiroshima (JP)

( * ) Notice: Subject to any disclaimer, the term of this patent is extended or adjusted under 35 U.S.C. 154(b) by 246 days.

(21) Appl. No.: 14/763,156

(22) PCT Filed: Apr. 11, 2014

(86) PCT No.: PCT/JP2014/060486
§ 371 (c)(1),
(2) Date: Jul. 23, 2015

(87) PCT Pub. No.: WO2015/155883
PCT Pub. Date: Oct. 15, 2015

(65) Prior Publication Data
US 2016/0252431 A1    Sep. 1, 2016

(51) Int. Cl.
*G01M 1/04* (2006.01)
*G01M 17/02* (2006.01)
*B29D 30/00* (2006.01)

(52) U.S. Cl.
CPC ....... *G01M 17/021* (2013.01); *B29D 30/0016* (2013.01); *G01M 1/045* (2013.01);
(Continued)

(58) Field of Classification Search
None
See application file for complete search history.

(56) References Cited

U.S. PATENT DOCUMENTS 3,053,400 A * 9/1962 Erickson ............ B29D 30/0016
198/340
4,078,339 A * 3/1978 Ongaro .................. B24B 5/366
451/1
(Continued)

FOREIGN PATENT DOCUMENTS

CN        1935497 B     3/2012
JP       61-212742 A    9/1986
(Continued)

OTHER PUBLICATIONS

Notice of Allowance in JP Application No. 2015-525332, dated Mar. 8, 2016.
(Continued)

*Primary Examiner* — Jill Culler
(74) *Attorney, Agent, or Firm* — Kanesaka Berner and Partners LLP (57) ABSTRACT

A tire holding device includes a guide which is provided between a pair of conveyors in a plan view and is provided on at least one of an upstream side and a downstream side of any one of an upper rim and a lower rim in a tire transport direction, and the guide guides a tire so that the center of the tire is coincident with the center of any one of the upper rim and the lower rim in the tire transport direction as the tire approaches any one of the upper rim and the lower rim by means of a lifting device.

10 Claims, 6 Drawing Sheets

(52) U.S. Cl.
CPC ... *G01M 17/024* (2013.01); *B29D 2030/0027* (2013.01); *B29D 2030/0066* (2013.01)

(56) References Cited

U.S. PATENT DOCUMENTS

| | | | | |
|---|---|---|---|---|
| 4,191,055 | A * | 3/1980 | Orem | G01M 1/045 |
| | | | | 73/462 |
| 4,638,756 | A * | 1/1987 | Collmann | B29D 30/0016 |
| | | | | 118/215 |
| 4,881,882 | A * | 11/1989 | Fantacci | B23Q 7/03 |
| | | | | 198/345.1 |
| 5,052,218 | A * | 10/1991 | Lwama | G01M 17/024 |
| | | | | 73/146 |
| 6,016,695 | A | 1/2000 | Reynolds et al. | |
| 6,988,397 | B1 * | 1/2006 | Delmoro | G01M 17/021 |
| | | | | 157/16 |
| 7,448,267 | B2 * | 11/2008 | Williams | G01M 1/045 |
| | | | | 73/462 |
| 2011/0221086 | A1 | 9/2011 | Hair et al. | |
| 2013/0333615 | A1 | 12/2013 | Wakazono et al. | |
| 2015/0362406 | A1 | 12/2015 | Seimoto et al. | |

FOREIGN PATENT DOCUMENTS

| | | |
|---|---|---|
| JP | 62-23701 U | 2/1987 |
| JP | 63-295242 A | 12/1988 |
| JP | 5-31096 B2 | 5/1993 |
| JP | 9-126935 A | 5/1997 |
| JP | 2006-214865 | 8/2006 |
| JP | 2007-279057 A | 10/2007 |
| JP | 2009-276892 | 11/2009 |
| JP | 2011-169768 A | 9/2011 |
| JP | 2011-255995 | 12/2011 |
| JP | 2012-185117 | 9/2012 |
| JP | 2013-61318 | 4/2013 |
| KR | 10-1549682 B1 | 9/2015 |
| TW | 201245682 A1 | 11/2012 |
| WO | 2013/027335 A1 | 2/2013 |
| WO | 2014/199508 A1 | 12/2014 |

OTHER PUBLICATIONS

Office Action in TW Application No. 103113414, dated Mar. 18, 2016.

Office Action in DE Application No. 112014000967.9, dated Jan. 16, 2017.

International Search Report dated Jun. 17, 2014, corresponding to International Patent Application No. PCT/JP2014/060486.

Written Opinion dated Jun. 17, 2014, corresponding to International Patent Application No. PCT/JP2014/060486.

* cited by examiner

TIRE HOLDING DEVICE AND TIRE TESTING SYSTEM

RELATED APPLICATIONS

The present application is a National Phase of International Application Number PCT/JP2014/060486, filed Apr. 11, 2014.

TECHNICAL FIELD

The present invention relates to a tire holding device and a tire testing system.

BACKGROUND ART

A tire testing system such as a uniformity machine which measures uniformity of a tire is known. In the tire testing system, in most cases, a tire holding device is provided, which interposes a bead portion of a tire between an upper rim and a lower rim and holds the tire after the tire is transported using a belt conveyor.

In PTL 1, a transport method is disclosed, which transports a tire to the center of a tester with a pair of belt conveyors which extends in a transport direction and is disposed with an interval between each other, and thereafter, lowers the belt conveyors to deliver the tire to a lower rim.

In PTL 2, means for applying a lubricant to upper and lower bead regions of a tire is disclosed. In this way, by applying the lubricant to the upper and lower bead regions of the tire, it is possible to improve sealing performance and removal characteristics with respect to upper and lower rims.

In PTL 3, a tire testing system is disclosed, which includes a centering device which accurately disposes a tire carried onto an inlet conveyor at the center of a conveyor, transports the centered tire to the center of a measurement position using the conveyor, and measures the tire.

CITATION LIST

Patent Literature

[PTL 1] Japanese Unexamined Patent Application Publication No. 2011-169768
[PTL 2] Japanese Unexamined Patent Application Publication No. 2007-279057
[PTL 3] Japanese Unexamined Patent Application Publication No. 61-212742

SUMMARY OF INVENTION

Technical Problem

In the tire testing system disclosed in PTL 2, it is possible to improve the sealing performance and the removal characteristics with respect to the upper and lower rims. However, the lubricant may be attached to the belt of the conveyor. If the lubricant is attached to the conveyor, the tire is likely to slide on the conveyor. Accordingly, even when the conveyor is operated at a predetermined amount to transport the tire to the measurement position, the position of the tire with respect to the conveyor is deviated in the transport direction. In addition, a positional deviation of the tire with respect to the conveyor in the transport direction may occur due to aging degradation of the conveyor belt, insufficient contact area between the tire and the conveyor belt due to differences in shapes of the tires, a seam of the conveyor in the transport direction, or the like.

If the position of the tire is deviated in the transport direction, even when the tire is centered as in PTL 3, it is not possible to accurately insert the upper and lower rims into the tire. In this way, if the insertion accuracy of the upper and lower rims deteriorates, an unintended portion of the tire is interposed between the upper and lower rims, and thus, the tire may be damaged.

An object of the present invention is to provide a tire holding device and a tire testing system capable of accurately inserting an upper rim and a lower rim into a tire and preventing damage of the tire.

Solution to Problem

According to a first aspect of the invention, there is provided a tire holding device which interposes and holds a tire between an upper rim and a lower rim from both sides in a vertical direction, in which the tire is transported in a state where the center axis of the tire is directed toward the vertical direction by a pair of conveyors disposed with a gap therebetween, including: a lifting device which moves the pair of conveyors and any one of the upper rim and the lower rim, and causes the tire transported by the conveyors to approach any one of the upper rim and the lower rim; and a guide which is provided between the pair of conveyors in a plan view, is provided on at least one of an upstream side and a downstream side of any one of the upper rim and the lower rim in a tire transport direction, and guides the tire so that the center of the tire is coincident with the center of any one of the upper rim and the lower rim in the tire transport direction as the tire approaches any one of the upper rim and the lower rim by means of the lifting device.

According to a second aspect of the invention, in the tire holding device related to the first aspect, the guide may include a concave guide surface which is recessed on the upper rim side or the lower rim side in a transport direction.

According to a third aspect of the invention, in the tire holding device related to the first or second aspect, the guide may include a roller which rolls in the vertical direction.

According to a fourth aspect of the invention, in the tire holding device related to the third aspect, the roller may roll in a horizontal direction intersecting the transport direction in addition to in the vertical direction.

According to a fifth aspect of the invention, in the tire holding device related to any one of the first to fourth aspects, the lifting device may move a position of the conveyor downward in a state where the position of the lower rim is fixed, and may guide the tire to the guide.

According to a sixth aspect of the invention, in the tire holding device related to the fifth aspect, the guide may be disposed below the conveyor when the position of the conveyor is in a transport position at which the tire is transported.

According to a seventh aspect of the invention, in the tire holding device related to any of the first to sixth aspects, the guide may included a detection unit which detects whether or not a positional deviation of the tire exceeds an allowable range of a preset positional deviation.

According to an eighth aspect of the invention, the tire holding device related to any one of the first to seventh aspects may further include: an adjustment mechanism which adjusts the position of the guide in the transport direction; and an advancing-retreating mechanism which advances and retreats the guide between a guide position at which the tire is guided and a retreat position.

According to a ninth aspect of the invention, there is provided a tire testing system including: the tire holding device related to any one of the first to eighth aspects; and a measurement device which measures a tire held by the tire holding device.

Advantageous Effects of Invention

According to the above-described tire holding device and tire testing system, it is possible to accurately insert an upper rim and a lower rim into a tire and to prevent damage of the tire.

DESCRIPTION OF EMBODIMENTS

Hereinafter, a tire holding device and a tire testing system according to an embodiment of the present invention will be described.

Figure 1:
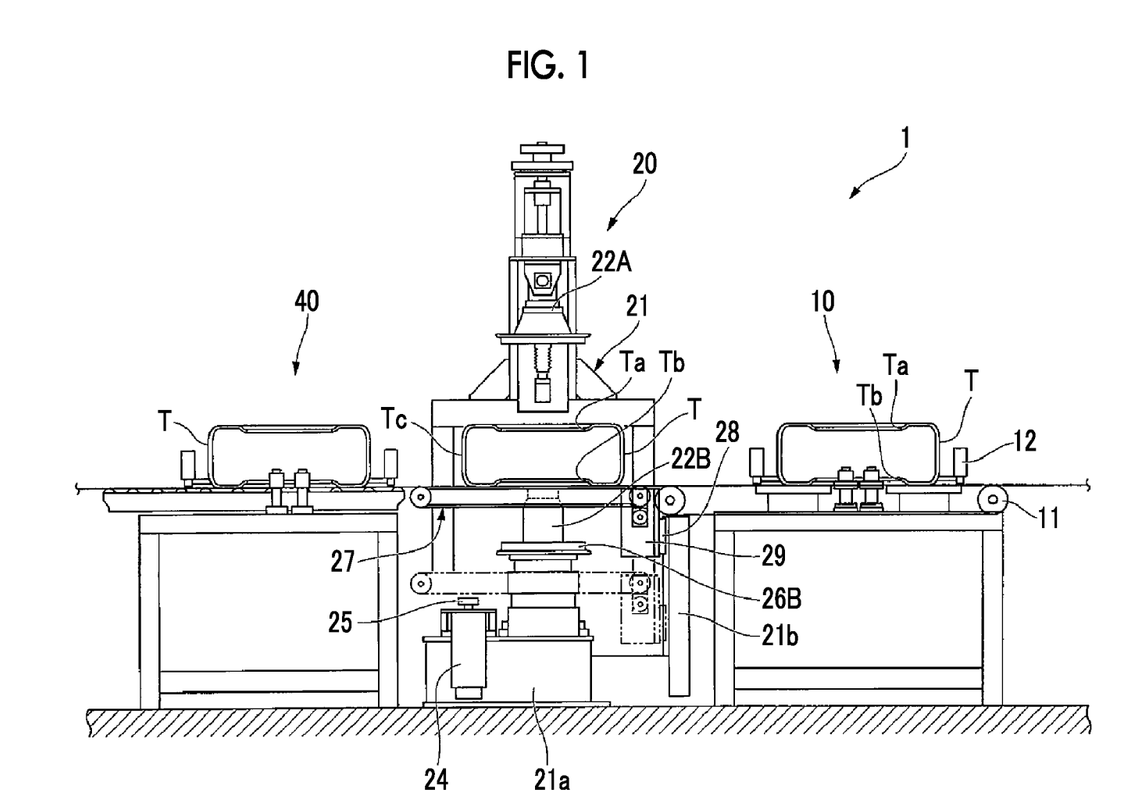
FIG. 1 is a front view of a tire testing system in an embodiment of the present invention.
Figure 2:
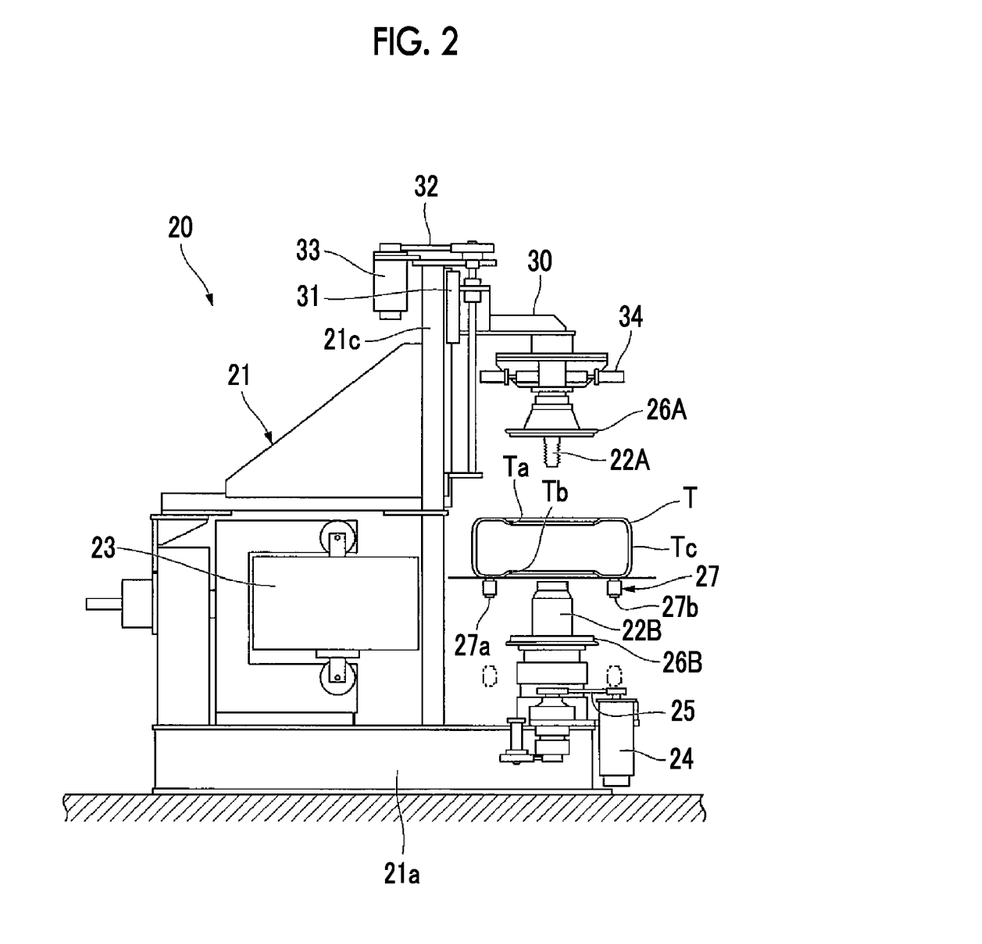
FIG. 2 is a side view of the tire testing system in the embodiment of the present invention.

FIG. 1 is a front view of the tire testing system in the embodiment of the present invention. FIG. 2 is a side view of the tire testing system in the embodiment of the present invention.

The tire testing system in this embodiment is a tire uniformity machine.

As shown in FIGS. 1 and 2, a tire testing system 1 includes a upstream-device 10 which performs lubrication of a bead or centering of a tire, a measurement portion 20 which is a measurement device, and a downstream device 40 which performs marking, grinding, or the like, in this order from an upstream side (right side in FIG. 1) in a tire transport direction.

The upstream-device 10 performs centering of a tire T to be tested and applies lubricant to each of upper and lower bead portions Ta and Tb of the tire T to be tested. The upstream-device 10 in this embodiment includes a belt conveyor 11 by which the tire T to be tested is transported in a state where an axis line of the tire T is directed toward a vertical direction. The tire T to be tested is transported to the measurement portion 20 at an appropriate timing by the belt conveyor 11. Here, in order to perform the centering of the tire T to be tested, the tire T to be tested is held by a centering device 12 included in the upstream-device 10, and thus, the center in a width direction of the belt conveyor 11 is coincident with the center of the tire T to be tested.

The measurement portion 20 measures uniformity with respect to the tire T to be tested which is rotatably supported by a tester main body 21, using a load wheel 23 (refer to FIG. 2) which is disposed in a direction opposing a tire tread Tc orthogonal to the tire transport direction, a sensor (not shown) for measuring the tire dimensions, or the like.

The downstream device 40 performs marking on a desired portion of the tire T to be tested in which the uniformity of the tire T has been measured by the measurement portion 20.

The measurement portion 20 includes an upper spindle 22A and a lower spindle 22B. The lower spindle 22B is rotatably driven on a base 21a of the tester main body 21. A driving force of a servo motor 24 is transmitted to the lower spindle 22B via a belt 25. In addition, a lower rim 26B which supports a lower bead portion Tb of the tire T to be tested is mounted on the lower spindle 22B.

A lower frame 21b of the tester main body 21 supports a belt conveyor 27 configuring a portion of a tire transport line. The belt conveyor 27 is liftably supported by the lower frame 21b via guide means 28 such as a linear guide. The belt conveyor 27 is lifted and lowered between a lifting limit position (a solid line position in FIGS. 1 and 2) which is the tire transport line and a lowering limit position (a chain line position in FIGS. 1 and 2) below a position at which the tire T to be tested comes into contact with the lower rim 26B, by a lifting device 29 including the servo motor (not shown).

As shown in FIG. 2, the belt conveyor 27 includes a pair of belts 27a and 27b which are separated from each other at a predetermined distance. When the belt conveyor 27 is lifted and lowered, the lower spindle 22B and the lower rim 26B can pass through a portion between the pair of belts 27a and 27b.

A rim elevator 30 is supported by an upper frame 21c of the tester main body 21. The rim elevator 30 is liftably supported via the guide means 31 such as a linear guide. The driving force of driving means 33 such as the servo motor is transmitted to the rim elevator 30 via a winding transmission device 32 such as a belt, and thus, the rim elevator 30 is lifted and lowered. The upper spindle 22A is supported by the rim elevator 30. The upper spindle 22A is detachably supported by the rim elevator 30 via a chuck device (not shown) and a chuck opening and closing cylinder 34. An upper rim 26A is mounted on the upper spindle 22A in advance.

The rim elevator 30 is lifted and lowered in a state where an axial center of the upper spindle 22A is coincident with an axial center of the lower spindle 22B. Accordingly, when the rim elevator 30 is lowered, the lower portion of the upper spindle 22A is inserted into the inner portion of the lower spindle 22b. The upper spindle 22A is locked at a predetermined insertion position by a lock mechanism (not shown) provided on the lower spindle 22B.

With respect to the tire T to be tested (refer to FIGS. 1 and 2) which is transported to the belt conveyor 27 along the tire transport line, the measurement portion 20 configured as described above fits the upper bead portion Ta of the tire T to be tested to the upper rim 26A at a predetermined inspection position in advance, and fits the lower bead portion Tb to the lower rim 26B. Subsequently, the measurement portion 20 supplies air to the portion between the upper rim 26A and the lower rim 26B, inflates the tire T to be tested, and predetermined inspection processing starts.

Figure 3:
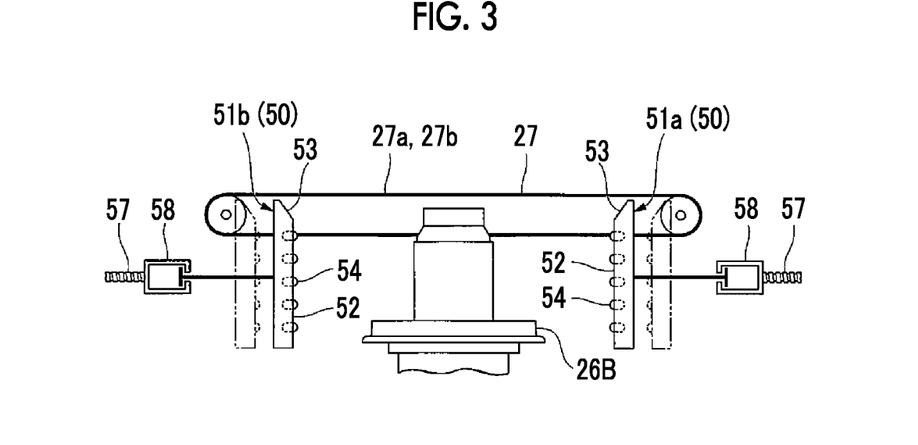
FIG. 3 is a sectional view of a guide in the embodiment of the present invention, and shows an operation of the guide which moves to a guide position.
Figure 4:
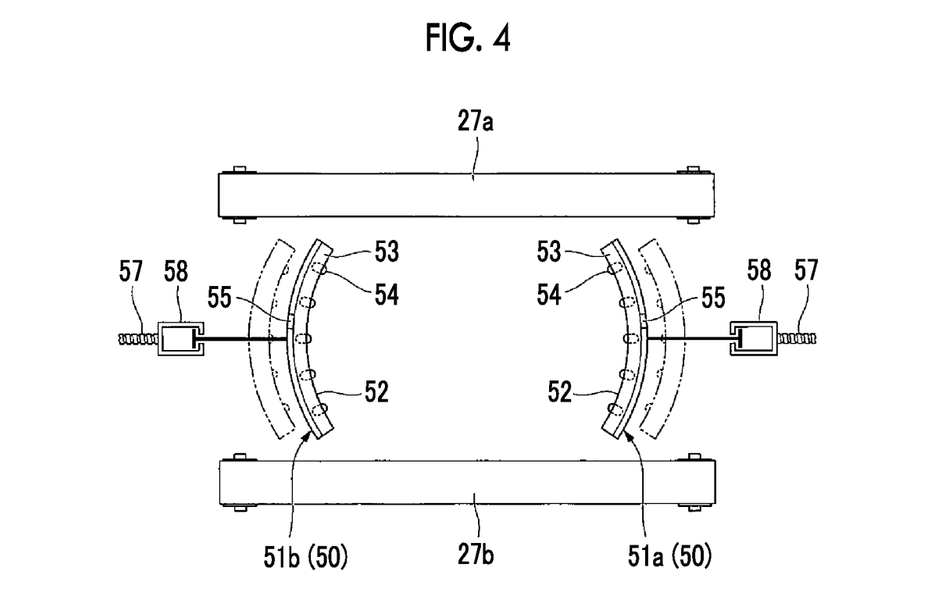
FIG. 4 is a top view of the guide in the embodiment of the present invention, and shows the operation of the guide which moves to the guide position.

FIG. 3 is a front view of a guide in the embodiment of the present invention. FIG. 4 is a top view of a guide in the embodiment of the present invention.

As shown in FIGS. 3 and 4, the measurement portion 20 further includes a guide 50. The guide 50 guides the tire T to be tested to the lower rim 26B. More specifically, the guide 50 guides the tire T to be tested so that the axial center of the guide 50 is coincident with the central axis (center) in the transport direction of the lower spindle 22B as the tire T to be tested in the state where the axial center (center) of the tire T is directed toward the vertical direction approaches the lower rim 26B. Here, the axial center of the tire T to be tested being coincident with the center axis of the lower spindle 22B means that the axial center of the tire T to be tested is disposed on the extension line of the lower spindle 22B.

The guide 50 is disposed between the belts 27a and 27b of the belt conveyor 27 in a plan view (when viewed above). That is, when the belt conveyor 27 is lifted and lowered, the guide 50 does not interfere with the belts 27a and 27b.

The guide 50 in this embodiment includes a pair of guide bodies 51a and 51b. Each of the guide bodies 51a and 51b is disposed on the upstream side and the downstream side in the transport direction of the lower rim 26B. The guide bodies 51a and 51b include concave guide surfaces 52 which are recessed toward the lower rim 26B side in the transport direction and oppose each other.

The sectional surface of each guide surface 52 in this embodiment is formed in an arc shape. A curvature radius of the guide surface 52 in an example of this embodiment is the same as the radius of the tire T to be tested having the largest size which is handled in the tire testing system 1.

The guide surface 52 includes an inclined surface 53 on at least the upper portion of the guide surface 52. Each of the inclined surfaces 53 included in the two guide surfaces 52 is inclined so that a gap between the guide surfaces 52 increases toward the upper portion. Here, the positions at which the inclined surfaces 53 are formed are not limited to the upper portions of the guide surfaces 52. For example, the inclined surfaces in the entire guide surfaces 52 may be formed so that the gap between the guide surfaces 52 gradually decreases toward the downward portion.

Here, a case where each of the guide bodies 51a and 51b includes the guide surface 52 having the curvature radius corresponding to the tire T to be tested having the largest size will be described as an example. However, dedicated guide bodies 51a and 51b are prepared for every kind of the tire T to be tested, and the guide bodies 51a and 51b may be properly used according to outer diameters of the various tires T to be tested.

Each of the guide bodies 51a and 51b includes a plurality of roller members 54 over the entire range of the guide surface 52. The roller members 54 are disposed with intervals between each other in the vertical direction and in a width direction of the belt conveyor 27. Friction between the tire T to be tested and the guide surfaces 52 is decreased by the roller members 54. Accordingly, it is possible to smoothly introduce the tire T to be tested to the lower rim 26B without ruining the posture of the tire T to be tested.

Figure 5:
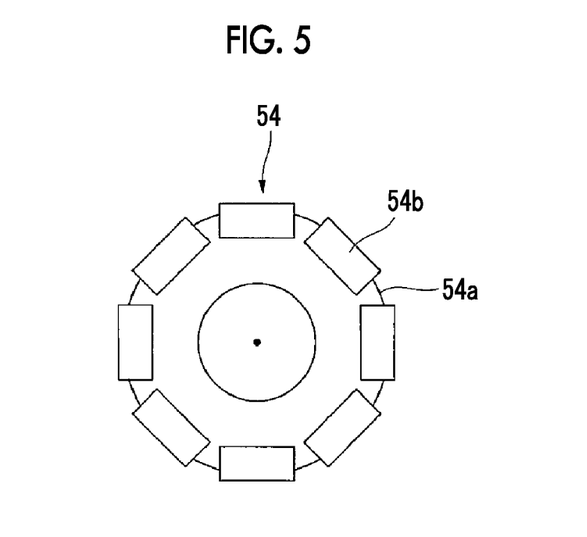
FIG. 5 is a front view of a roller member in the embodiment of the present invention.

FIG. 5 is a front view of the roller member in the embodiment of the present invention.

The roller member 54 is configured of a so-called omni wheel. That is, the roller member 54 includes a main body 54a which can rotate in the vertical direction of the guide bodies 51a and 51b, and a plurality of rollers 54b which can rotate in the width direction (in other words, in the horizontal direction intersecting the transport direction). The main body 54a is rotatably supported by the guide bodies 51a and 51b, and the rollers 54b are rotatably supported by the main body 54a.

Moreover, each of the guide bodies 51a and 51b includes a sensor (detection unit) 55 which detects whether or not a positional deviation in the tire transport direction of the tire T to be tested exceeds an allowable range of a predetermined positional deviation. The sensor 55 is attached to the upper end portion of each of the guide bodies 51a and 51b. Accordingly, when a shoulder portion or a side wall portion of the tire T to be tested comes into contact with the sensor 55, it is possible to detect the contact. The sensor 55 outputs the detection signals to a control device (not shown) or the like which drives and controls the tire testing system. Here, the control device (not shown) determines whether or not the position of the tire T to be tested is normal based on the detection signals from the sensor 55, and performs processing for outputting an alarm, stopping the device, or the like based on the determination results.

The guide portion 50 is supported by a lower portion of a frame of each of the upstream-device 10 and the downstream device 40 or is supported by the measurement portion 20. The guide 50 is supported by the lower portion of the frame or the measurement portion 20 via an adjustment mechanism 57 and an advancing-retreating mechanism 58.

The adjustment mechanism 57 adjusts the position of the guide 50 in the transport direction. In order words, the adjustment mechanism 57 adjusts the gap between the two guide bodies 51a and 51b. The gap between the guide bodies 51a and 51b is set according to the outer diameter of the tire T to be tested. For example, the adjustment mechanism 57 includes a ball screw, and it is possible to accurately adjust the gap between the guide bodies 51a and 51b by the rotation of the ball screw.

The advancing-retreating mechanism 58 advances and retreats the two guide bodies 51a and 51b between a guide position at which the tire T to be tested is guided and a retreat position at which the tire T to be tested is inflated. The advancing-retreating mechanism 58 can more rapidly advance and retreat the guide bodies 51a and 51b than the adjustment mechanism 57 by using a fluid pressure cylinder such as an air cylinder.

Here, the above-described guide position means the position at which the guide bodies 51 and 51b approach the lower rim 26B in the transport direction of the tire T to be tested. In addition, the retreat position means the position at which the guide bodies 51a and 51b are separated from the lower rim 26B. For example, the retreat position means the position at which each of the guide bodies 51a and 51b is sufficiently retreated to the upstream side and the downstream side in the transport direction of the tire T to be tested so that the tire T to be tested does not interfere with the pair of guide bodies 51a and 51b when air is injected into the tire T to be tested and the tire T is inflated. In addition, at the retreat position, the pair of guide bodies 51a and 51b does not interfere with other devices, for example, the load wheel 23 or the like when the tire T to be tested is measured.

The adjustment mechanism 57 and the advancing-retreating mechanism 58 are connected in series. When the case in which an air cylinder is used as the advancing-retreating mechanism 58 and a ball screw is used as the adjustment mechanism 57 is described as an example, first, a nut portion (not shown) of the ball screw is fixed to the frame of the upstream-device 10 or the downstream device 40. In addition, for example, a cylinder case of a fluid pressure cylinder is attached to the tip of the ball screw. Moreover, for example, the guide bodies 51a and 51b are attached to the tip of a rod of the fluid pressure cylinder. In addition, the ball screw may be operated using an actuator, or may be manually operated.

The tire holding device of the present invention is configured of the upper spindle 22A, the lower spindle 22B, the rim elevator 30, the lifting device 29, and the guide 50 of the above-described embodiment.

Next, a holding operation of the tire T to be tested in the above-described tire testing system 1 will be described with reference to the drawings.

Figure 6:
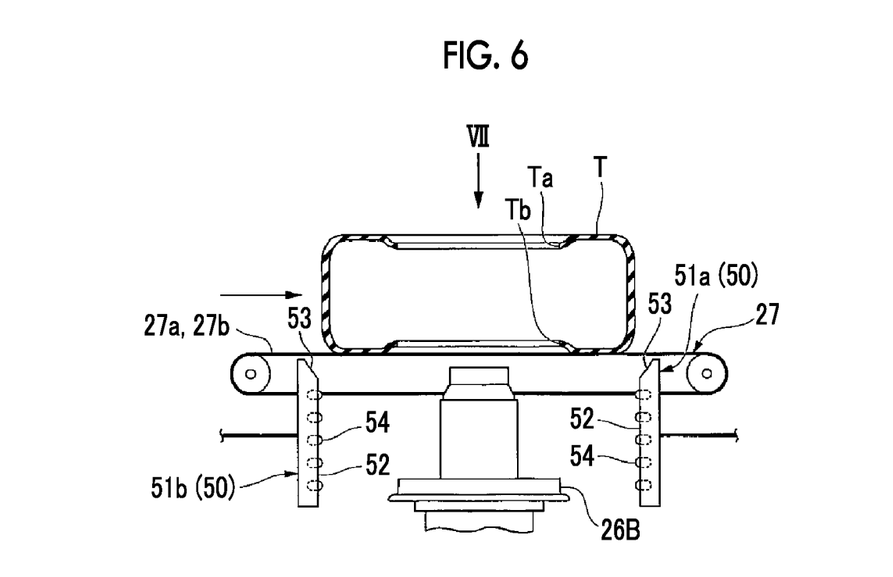
FIG. 6 shows a state where a tire to be tested is carried into a measurement portion in the embodiment of the present invention.
Figure 7:
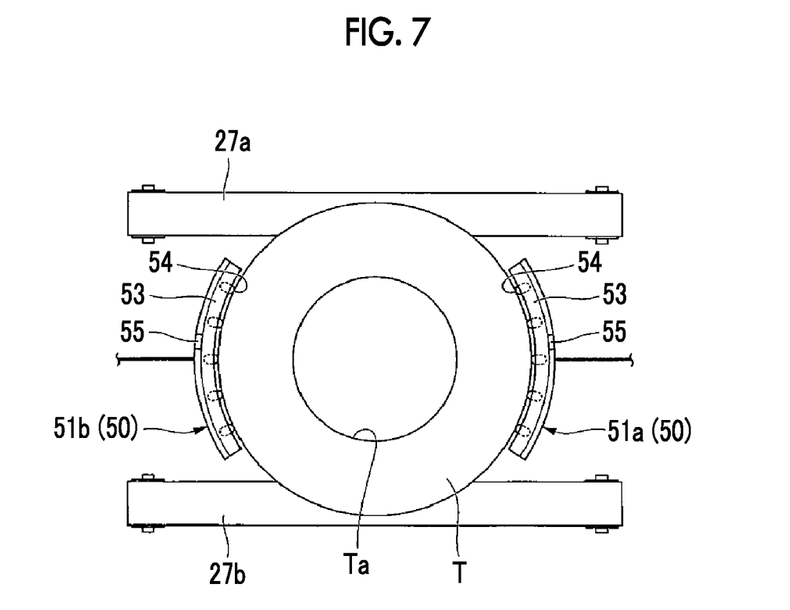
FIG. 7 is a view when viewed from VII direction of FIG. 6.
Figure 8:
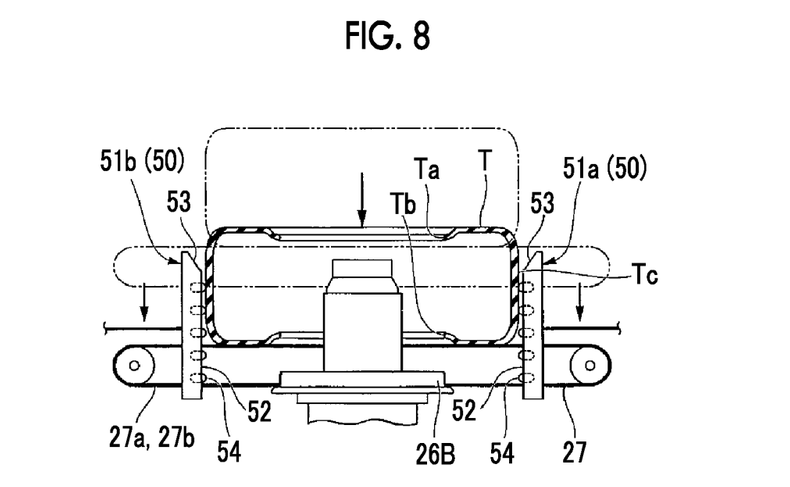
FIG. 8 shows a state in which a belt conveyor is being lowered in the embodiment of the present invention.
Figure 9:
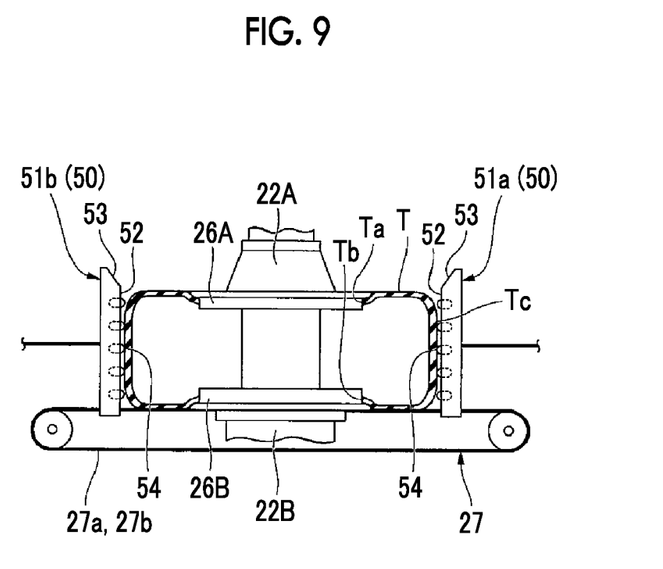
FIG. 9 shows a state where an upper rim is lowered and the tire to be tested is interposed between the upper rim and a lower rim in the embodiment of the present invention.
Figure 10:
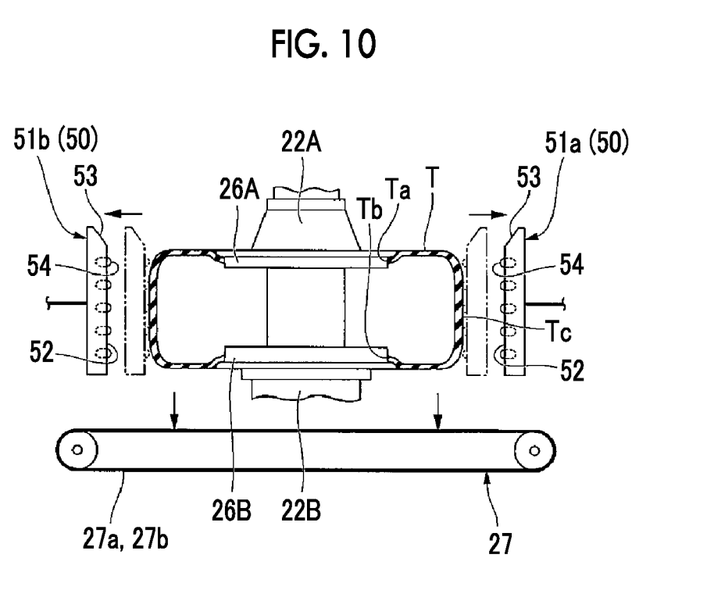
FIG. 10 shows a state where the guide moves to a retreat position in the embodiment of the present invention.

FIG. 6 shows a state where the tire to be tested is carried into the measurement portion in the embodiment of the present invention. FIG. 7 is a view when viewed from VII direction of FIG. 6. FIG. 8 shows a state in which a belt conveyor is being lowered in the embodiment of the present invention. FIG. 9 shows a state where the upper rim is lowered and the tire to be tested is interposed between the upper rim and the lower rim in the embodiment of the present invention. FIG. 10 shows a state where the guide moves to the retreat position in the embodiment of the present invention.

In order to start predetermined inspection processing with respect to the tire T to be tested, the gap between the pair of guide bodies 51*a* and 51*b* is adjusted by the adjustment mechanism 57 according to the outer diameter of the tire T to be tested. Here, in the present embodiment, the gap between the guide bodies 51*a* and 51*b* is adjusted so that the gap between the tire T to be tested and the guide bodies 51*a* and 51*b* becomes a predetermined adjustment gap (for example, 10 mm or less) at the lower rim 26B side.

As shown in FIGS. 3 and 4, first, the guide bodies 51*a* and 51*b* move from the retreat position to the guide position. In this state, as shown in FIGS. 6 and 7, the tire T to be tested which is centered in advance by the upstream-device 10 is carried into the measurement portion 20 using the belt conveyor 27. The tire T to be tested which is carried into the measurement portion 20 is stopped at the predetermined inspection position by controlling an amount of rotation of the belt conveyor 27. In this case, the position of the tire T to be tested may be slightly (larger than the above-described adjustment gap) deviated from the predetermined inspection position in the transport direction due to sliding or the like during the transport of the belt conveyor 27. Meanwhile, the positional deviation of the tire T to be tested hardly occurs in the width direction of the belt conveyor 27.

Subsequently, as shown in FIG. 8, the belt conveyor 27 is lowered. Accordingly, the tire T to be tested which is placed on the belt conveyor 27 is lowered along with the belt conveyor 27. In this case, while the state where the tire T to be tested is placed on the belt conveyor 27 is maintained, the upstream side and the downstream side of the tire T to be tested in the transport direction are guided by the guide bodies 51*a* and 51*b*.

Moreover specifically, when the positional deviation of the tire T to be tested occurs on the upstream side in the tire transport direction, the tire T to be tested abuts against the inclined surface 53 of the upstream guide body 51*a*. Accordingly, the position of the tire T to be tested is corrected at the downstream side as the tire T to be tested approaches the lower rim 26B. Meanwhile, when the positional deviation of the tire T to be tested occurs on the downstream side in the tire transport direction, the tire T to be tested abuts against the inclined surface 53 of the downstream guide body 51*b*. Accordingly, the position of the tire T to be tested is corrected at the upstream side as the tire T to be tested approaches the lower rim 26B. As a result, when the tire T to be tested comes into contact with the lower rim 26B, the center in the tire transport direction of the lower rim 26B is coincident with the center in the tire transport direction of the tire T to be tested.

Here, when the belt conveyor 27 is lowered, a lowering speed of the belt conveyor 27 may decrease as the belt conveyor 27 approaches the lower rim 26B. Accordingly, it is possible to guide the tire T to be tested using the guide 50 while preventing the posture of the tire T to be tested from being disturbed. The upper surface of the belt conveyor 27 moves to a position which is slightly lower than the lower rim 26B. Accordingly, the tire T to be tested is supported from the lower portion by the belt conveyor 27 and the lower rim 26B.

Moreover, when the belt conveyor 27 is lowered, before the upper surface of the belt conveyor 27 moves to the position which is slightly lower than the lower rim 26B, the lowering of the belt conveyor 27 may be temporarily stopped at the timing at which the position of the upper surface of the belt conveyor 27 is approximately coincident with the position of the lower rim 26B in the vertical direction. Accordingly, even when the tire T to be tested is unstable during the lifting and lowering and is swung, it is possible to support the tire T to be tested by both the lower rim 26B and the belt conveyor 27. Therefore, the swinging of the tire T to be tested is prevented, and it is possible to prevent insertion of the tire T to be tested into the lower rim 26B from being inhibited.

Next, as shown in FIG. 9, the upper spindle 22A is lowered, and the tire T to be tested is interposed between the upper rim 26A and the lower rim 26B. The upper spindle 22A is locked to the lower spindle 22B by the lock mechanism. The upper rim 26A is inserted into the upper bead portion Ta of the tire T to be tested, and the lower rim 26B is inserted into the lower bead portion Tb of the tire T to be tested.

Thereafter, air is supplied to the inner portion of the tire T to be tested, and thus, the tire T is inflated. As shown in FIG. 10, immediately before the tire T to be tested is inflated, the guide bodies 51*a* and 51*b* move from the guide position to the retreat position, and simultaneously with the movements of the guide bodies 51*a* and 51*b*, the belt conveyor 27 moves to the position of the lowering limit. Thereafter, the upper spindle 22A and the lower spindle 22B are rotated, and uniformity or the like of the tire T to be tested is measured by the load wheel 23, a dimension measurement sensor (not shown), or the like.

After the inspection performed by the measurement portion 20 ends, air is extracted from the tire T to be tested. In addition, the locked state between the upper spindle 22A and the lower spindle 22B is released, and the upper spindle 22A moves upward. Subsequently, the belt conveyor 27 moves to the upper transport position. Accordingly, the tire T to be tested moves to the transport position along with the belt conveyor 27. Thereafter, the tire T to be tested is carried-out from the measurement portion 20 to the downstream device 40 by the belt conveyor 27, and processing such as marking is performed.

Therefore, according to the above-described embodiment, when the tire T to be tested approaches the lower rim 26B, the tire T to be tested is guided by the guide 50, and it is possible to cause the center position of the tire T to be tested to coincide with the center position of the lower rim 26B. As a result, it is possible to accurately insert the upper rim 26A and the lower rim 26B into the tire T to be tested, and it is possible to prevent the damage of the tire T to be tested.

In addition, the pair of guide bodies 51*a* and 51*b* includes concave guide surfaces 52, and thus, it is possible to prevent the position of the tire T to be tested from being deviated in the width direction of the belt conveyor 27. Moreover, since each of the guide bodies 51a and 51b is disposed on the upstream side and the downstream side in the transport direction with respect to the lower rim 26B, it is possible to correct the positional deviation in the transport direction of the tire T to be tested.

In addition, since the plurality of roller members 54 which can roll in the vertical direction are provided on the guide surfaces 52 of the guide bodies 51a and 51b, the friction between the tire T to be tested and the guide surface 52 decreases. Accordingly, it is possible to smoothly introduce the tire T to be tested to the lower rim 26B without ruining the posture of the tire T to be tested. Moreover, since the roller members 54 can also roll in the horizontal direction intersecting the transport direction, it is possible to displace the guide bodies 51a and 51b in the rotation direction of the tire T to be tested. Accordingly, it is possible to further decrease the friction between the tire T to be tested and the guide bodies 51a and 51b.

Moreover, when the belt conveyor 27 is disposed at the transport position at which the tire T to be tested is transported, since the guide 50 is positioned below the belt conveyor 27, the transport of the tire T to be tested is not inhibited. Therefore, it is not necessary to retreat the guide 50 from a transport path when the tire T to be tested is transported, and thus, it is possible to prevent a tact time from increasing.

In addition, since the sensors 55 are attached to the guide bodies 51a and 51b, it is possible detect that the positional deviation of the tire T to be tested exceeds the allowable range. Accordingly, for example, when the tire T to be tested cannot be guided by the guide bodies 51a and 51b, it is possible to inform the state to an operator or the like. In addition, for example, when the tire T to be tested cannot be guided by the guide bodies 51a and 51b, it is possible to automatically stop the device.

Moreover, since the advancing-retreating mechanism 58 is provided, it is possible to rapidly move the guide bodies 51a and 51b between the guide position and the retreat position. Meanwhile, since the adjustment mechanism 57 is provided, it is possible to accurately adjust the positions in the transport directions of the guide bodies 51a and 51b. As a result, shortening of the tact time is realized, and it is possible to accurately fit the tire T to be tested into the upper rim 26A and the lower rim 26B.

Moreover, since it is possible to accurately fit the tire T to be tested into the upper rim 26A and the lower rim 26B, it is possible to more accurately measure the tire T to be tested.

The present invention is not limited to the above-described embodiment, and includes various modifications with respect to the above-described embodiment within a scope which does not depart from the gist of the present invention. That is, the specific shapes, configurations, or the like described in the embodiment are only examples, and the embodiment may be appropriately modified.

For example, in the above-described embodiment, the case where the belt conveyor 27 moves downward and the belt conveyor 27 and the lower rim 26B move relative to each other is described. However, the method in which the belt conveyor 27 and the lower rim 26B move relative to each other is not limited to this. For example, the lower rim 26B may move upward. In this case, the guide 50 moves upward along with the lower rim 26B.

In addition, in the above-described embodiment, the case is described, in which, first, the tire T to be tested which is carried into the measurement portion 20 comes into contact with the lower rim 26B, and, thereafter, the upper rim 26A is lowered, and the tire T to be tested is interposed between the upper rim 26A and the lower rim 26B. However, the tire T to be tested which is carried into the measurement portion 20 comes into contact with the upper rim 26A, and thereafter, the lower rim 26B approaches the tire T to be tested, and the tire T to be tested may be interposed between the upper rim 26A and the lower rim 26B. In this case, the guide bodies 51a and 51b are disposed on the upstream side and the downstream side of the upper rim 26A. Moreover, the guide 50 guides the tire T to be tested so that the center of the tire T to be tested is coincident with the center of the upper rim 26A in the tire transport direction.

In addition, in the above-described embodiment, the case is described, in which the cross-sectional surfaces of the guide bodies 51a and 51b are formed in arc shapes and the concave guide surfaces 52 are formed on the guide bodies 51a and 51b. However, the shape of each of the guide bodies 51a and 51b is not limited to the above-described shape. For example, the concave guide surface 52 may be formed in cross-sectional surface shapes which are different from the arc shape. In addition, the case in which each of the guide bodies 51a and 51b is integrally formed on the upstream side and the downstream side in the transport direction is described. However, any shape may be adopted as long as each of the guide bodies 51a and 51b can guide the tire T to be tested, for example, the guide bodies 51a and 51b may be formed of a plurality of guide divided bodies.

Moreover, in the above-described embodiment, the case where each of the guide bodies 51a and 51b includes the sensor 55 is described. However, the sensor 55 may be a contact type sensor or a non-contact type sensor. In addition, the sensor 55 may be appropriately provided, and may be omitted.

In addition, in the above-described embodiment, the case where each of the guide bodies 51a and 51b includes roller members 54 is described. However, instead of the roller members 54, a layer formed of a material having a low friction coefficient may be formed on the surfaces of the guide surfaces 52 of the guide bodies 51a and 51b. In addition, when sufficient sliding is generated on the surfaces of the guide bodies 51a and 51b, the roller member 54 or the layer formed of the material having a low friction coefficient may be omitted.

Moreover, in the above-described embodiment, the case is described, in which adjustment mechanism 57 is configured of the ball screw, and the advancing-retreating mechanism 58 is configured of the fluid pressure cylinder. However, the present invention is not limited to the ball screw or the fluid pressure cylinder. Moreover, only the adjustment mechanism 57 is provided, and the advancing-retreating mechanism 58 may be omitted.

Moreover, in the above-described embodiment, the case where the pair of guide bodies 51a and 51b is provided on the upstream side and the downstream side in the transport direction of the lower rim 26B is described. However, the present invention is not limited to this configuration, and for example, only one of the guide bodies 51a and 51b may be installed. For example, when only the guide body 51b of the downstream side is provided, a feeding amount of the belt conveyor 27 is set so as to be larger than a defined amount in advance, and thus, the tire T to be tested may be transported so as to be deviated to the downstream side. Accordingly, by using only the guide body 51b on the downstream side, it is possible to guide the tire T to be tested so that the center of the tire T to be tested is coincident with the center of the lower rim 26B. Moreover, similarly, when only the guide body 51*a* of the upstream side is provided, the feeding amount of the belt conveyor 27 is set so as to be smaller than the defined amount in advance, and thus, the tire T to be tested may be transported so as to be necessarily deviated to the upstream side. Accordingly, by using only the guide body 51*a* on the upstream side, it is possible to guide the tire T to be tested so that the center of the tire T to be tested is coincident with the center of the lower rim 26B.

Moreover, in the above-described embodiment, the case where the tire uniformity machine is used as an example of the tire testing system 1 is described. However, the tire testing system 1 is not limited to the uniformity machine. Moreover, the device to which the tire holding device of the present invention is applied is not limited to the tire uniformity machine.

INDUSTRIAL APPLICABILITY

According to the present invention, in a tire holding device which holds a tire transported by a pair of conveyors disposed at an interval, it is possible to accurately fit an upper rim and a lower rim to the tire.

The invention claimed is:

1. A tire holding device which interposes and holds a tire between an upper rim and a lower rim from both sides in a vertical direction, in which the tire is transported in a state where the center axis of the tire is directed toward the vertical direction by a pair of conveyors disposed with a gap therebetween, comprising:
    a lifting device which moves the pair of conveyors and any one of the upper rim and the lower rim, and causes the tire transported by the conveyors to approach any one of the upper rim and the lower rim; and
    a guide which is provided between the pair of conveyors in a plan view, is provided on at least one of an upstream side and a downstream side of any one of the upper rim and the lower rim in a tire transport direction, and guides the tire so that the center of the tire is coincident with the center of any one of the upper rim and the lower rim in the tire transport direction as the tire approaches any one of the upper rim and the lower rim by means of the lifting device,
    wherein the guide includes a concave guide surface which is recessed on the upper rim side or the lower rim side in a transport direction, having a curvature radius being the same as the radius of the tire.

2. The tire holding device according to claim 1, wherein the guide includes a roller main body which rolls in the vertical direction, and a plurality of rollers disposed at outer periphery of the roller main body, which roll in a horizontal direction intersecting the transport direction in addition to in the vertical direction.

3. The tire holding device according to claim 1, wherein the lifting device moves a position of the conveyor downward in a state where the position of the lower rim is fixed, and guides the tire to the guide.

4. The tire holding device according to claim 3, wherein the guide is disposed below the conveyor when the position of the conveyor is a transport position at which the tire is transported.

5. The tire holding device according to claim 1, wherein the guide includes a detection unit which detects whether or not a positional deviation of the tire exceeds an allowable range of a preset positional deviation.

6. The tire holding device according to claim 1, further comprising:
    an adjustment mechanism which adjusts the position of the guide in the transport direction; and
    an advancing-retreating mechanism which advances and retreats the guide between a guide position at which the tire is guided and a retreat position.

7. A tire testing system, comprising:
    the tire holding device according to claim 1; and
    a measurement device which measures a tire held by the tire holding device.

8. The tire holding device according to claim 1, wherein the guide surface has an inclined surface on at least the upper portion of the guide surface, of which radial dimension is continuously extended in an upward direction.

9. The tire holding device according to claim 1, wherein the guide has a vertical dimension of larger than the width of the tire.

10. The tire holding device according to claim 1, wherein the rollers are disposed to the guide surface in the vertical direction and/or circumferential direction of the tire.

* * * * *